Jan. 15, 1952   H. WARP   2,582,515
FLUID CONDUCTING MEANS
Filed June 28, 1946   2 SHEETS—SHEET 1
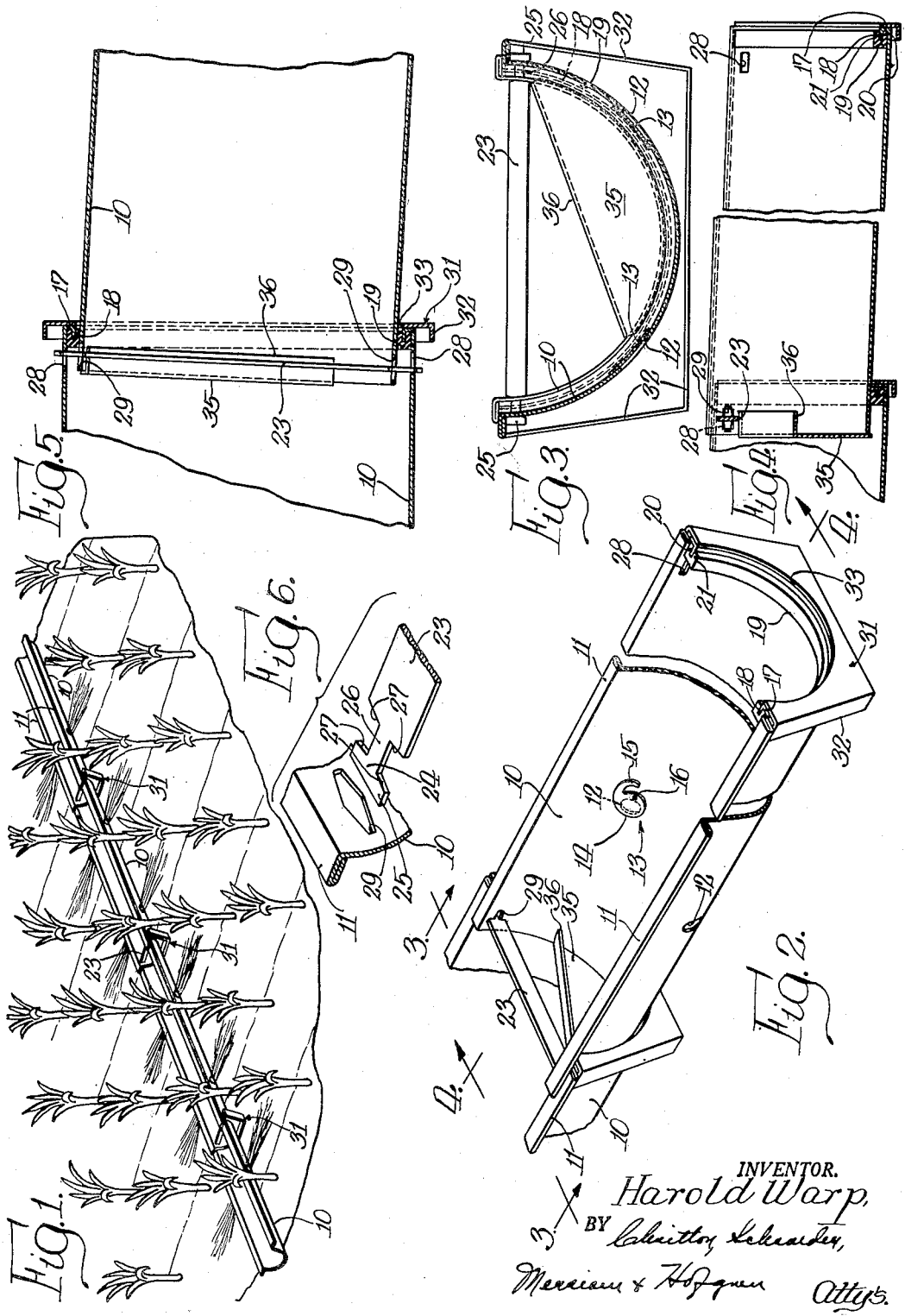
INVENTOR.
Harold Warp,
BY
Attys.

Jan. 15, 1952          H. WARP          2,582,515
FLUID CONDUCTING MEANS
Filed June 28, 1946          2 SHEETS—SHEET 2
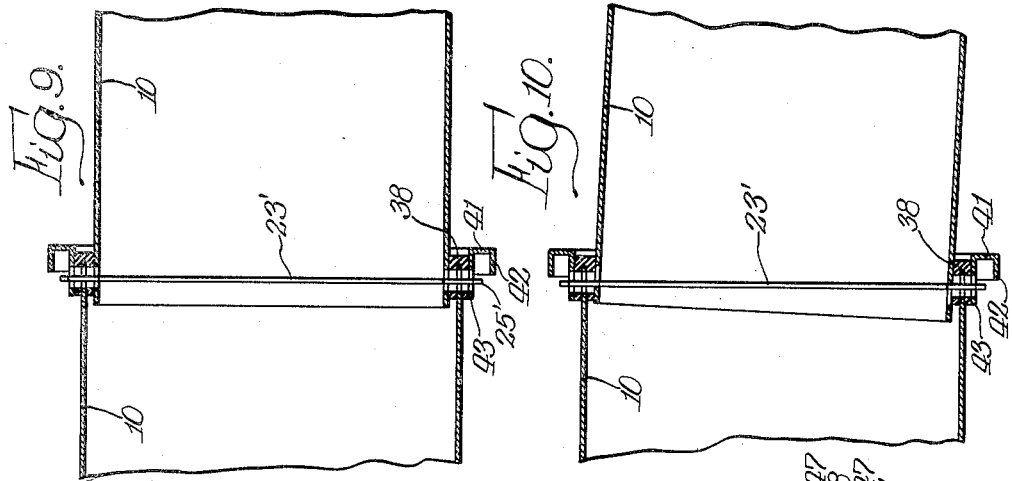
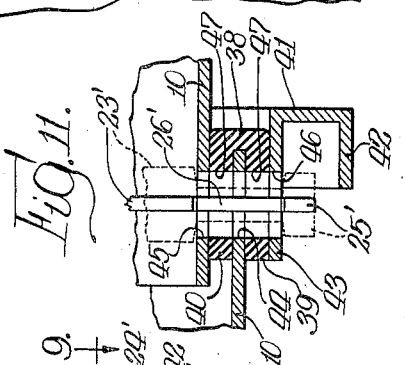
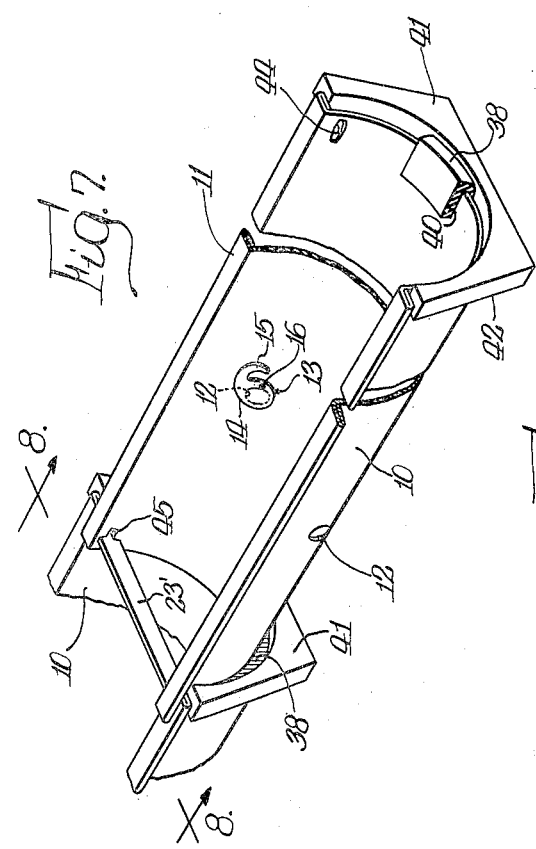
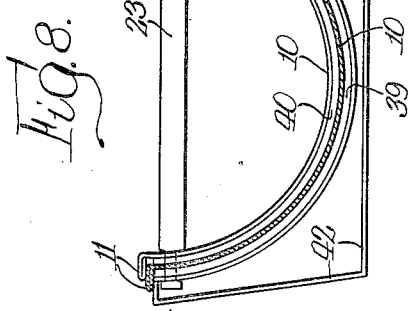
INVENTOR.
Harold Warp,
BY Patented Jan. 15, 1952

2,582,515

UNITED STATES PATENT OFFICE 2,582,515

FLUID CONDUCTING MEANS

Harold Warp, Chicago, Ill., assignor to Flex-O-Glass, Inc., a corporation of Illinois Application June 28, 1946, Serial No. 680,336

11 Claims. (Cl. 61—12)

The invention relates to fluid conveying means and more particularly to liquid conveying.

On object of the invention is to provide water-conveying conduits which are sturdy yet very light in weight so that they may be readily carried and transported.

Another object is to provide water-conveying conduits composed of sections with each section having the ends thereof adapted for cooperation with an adjacent section to form a comparatively fluid-tight joint permitting of some angular disposition of one section relative to another.

A further object is to provide approximately semicylindrical conduit sections having means for locking sections together which means also serves as lateral reinforcing for the conduit sections.

Yet another object is to provide approximately semicylindrical conduit sections and means for sealing the joined sections at the joints, each section being completely free at each end of flanges, offsets or other effects requiring special forming operations.

Other objects and advantages will become apparent from the following detailed description taken in connection with the accompanying drawings, in which:

Fig. 1 is a view in perspective illustrating an irrigating means embodying the features of my invention.

Fig. 2 is an enlarged perspective view of portions of conduit sections to show certain details of construction.

Fig. 3 is a transverse section taken approximately along the line 3—3 of Fig. 2.

Fig. 4 is a longitudinal section taken approximately along the line 4—4 of Fig. 2.

Fig. 5 is a further enlarged plan section showing sections of conduits disposed at an angle to one another.

Fig. 6 is an enlarged fragmentary view of a portion of the section locking means.

Fig. 7 is a view similar to Fig. 2 showing a modified form of conduit section and sealing means.

Fig. 8 is a transverse sectional view taken approximately along the line 8—8 of Fig. 7.

Fig. 9 is a plan section taken approximately along the line 9—9 of Fig. 8.

Fig. 10 is a view similar to Fig. 9 but showing the sections disposed at an angle to one another.

Fig. 11 is a fragmentary enlarged sectional view through a joint at the plane 9—9 of Fig. 8.

While the invention is susceptible of various modifications and alternative constructions, it is shown in the drawings and will hereinafter be described in a preferred embodiment and one modification. It is not intended, however, that the invention is to be limited thereby to the specific disclosures made. On the contrary, it is intended to cover all modifications and alternative constructions falling within the spirit and scope of the invention as defined in the appended claims.

In irrigating a crop, shown by way of example in Fig. 1 as a field of corn, it of course becomes necessary to convey the water through the field transversely of the rows so that the water may be permitted to flow between the rows of the product to be irrigated, herein corn. In many instances this is effected by the formation of earth ditches, the water in the ditches being lifted by means of a siphon tube over the bank of the ditch and discharged between the rows of corn. The formation of these ditches, of course, requires a great deal of labor; it cuts up the fields making cultivating and harvesting of the crop more difficult; and, of course, further necessitates constant attention. Various attempts have, therefore, been made to provide conduits which can be temporarily extended transversely of the rows of corn. If these conduits are not to provide the same interference with and hindrance to cultivating and harvesting of the rows, they must be capable of being readily set up and removed. Up to the present time, however, the conduits have been heavy and cumbersome, requiring several men for the convenient handling of a conduit section of any considerable length and otherwise limiting the number that can be transported in any one load, etc. It is to overcome these deficiencies, as well as to provide a conduit that may be economically and quickly manufactured that I have perfected the invention herein disclosed.

Speaking first generally of both forms of the invention, the irrigating means comprises a plurality of conduit sections 10 each composed of and formed from a comparatively thin sheet of metal. These sections are trough-like being actually somewhat less than semicylindrical so as to permit nesting of the sections one within the other when not in use and being of different radius at the opposite ends so as to permit the end of one section to be received in the opposite end of another section, and yet permit suitable sealing means to be interposed therebetween when assembled to form a continuous conduit. It is contemplated that the sheets from which the conduits are formed will be in the order of .015 of an inch thick when the metal is steel or iron. Obviously when the sheets are of some other metal having a lower tensile strength, such as aluminum, the sheets may be somewhat thicker. By such increased thickness of sheet, where other than steel or iron sheets are employed, the weight of a conduit or any unit of length thereof is not, however, increased but is maintained approximately the same because the specific gravity of the metal is lower. It is an objective of this invention to have the conduits, though formed from thin sheets of metal, so constructed as to be capable of carrying at least twenty times their own weight in water.

As above stated, the conduit sections are formed from sheets of metal. Preferably, these are substantially rectangular sheets which are acted upon while in a flat state to incorporate certain structural features therein, and are subsequently formed into the slightly less than semi-cylindrical troughs. In order for one end of one conduit section to be received within the opposite end of another conduit section with a sealing means therebetween, the end of the first mentioned section must have a radius smaller than the end of the other section. This is preferably accomplished by a gradual reduction in the radius of the conduit and may be accomplished while employing a rectangular sheet of metal. It is contemplated, of course, that the sheet may also be cut on a very slight taper and then formed into the trough-like section with a progressively reduced radius from one end to the other.

To make the conduit sections capable of serving their purpose, particularly of carrying twenty times their own weight in water despite the unusual thinness of the material of which they are made and their trough-like shape, the conduit sections are given certain compensating structural features. As a first step in the strengthening and stiffening of each conduit section, each longitudinal edge thereof is formed with a laterally extending flange 11 formed by folding each longitudinal edge of the sheet back upon itself and then bending each flange to extend substantially at right angles to the side walls of the conduit immediately adjacent the flange 11. Such longitudinally extending flanges 11 stiffen the conduit sections against bending between supports and they also aid in strengthening each conduit section against the lateral pressure which is exerted by the water carried in the conduits. The sections are further reinforced against such lateral collapse by joining or locking means hereinafter described.

Inasmuch as the conduits are to be employed for distributing as well as conducting water, there are formed in each section one or more water discharge openings 12 arranged in rows on each side of the center of the conduit section. The number of openings will vary with the length of the section and the type of crop to be irrigated. For convenience in handling, each section 10 herein is made in the neighborhood of seven feet in length with openings 12 spaced about forty-two inches apart. The openings 12 are controlled by valves 13 which herein take the form of extremely thin sheets of noncorrosive material preferably galvanized steel, brass, aluminum, etc. Each valve 13 has a generally oval body portion 14 larger than the openings 12 and a handle-like extension 15 forming a finger grip which may be grasped for opening or closing the valve. It will be quite readily apparent that the valve 13 is of such shape that two valves may be formed from a single circular disk of the sheet from which the valve is formed. Each valve is pivotally mounted directly to the conduit section as by means of a rivet 16 passing through the valve near the inner edge of the body portion 14 thereof. The valve is composed of very thin material, on the order of .004 of an inch, so as to be very highly flexible and capable of conforming, by reason of the pressure of water in the conduit alone, to the slight curvature of the conduit section and thus effectively sealing the opening as well as remaining in any position of partial or full opening of the valve.

It is contemplated, of course, that the sections will be assembled in the field so as to form a continuous, water-conducting or transporting means of considerable length. To make this possible, sealing means is provided at the joining of two conduit sections which sealing means herein is capable of permitting assembly of the conduit sections with some angular displacement one relative to the other, so as to follow the contour of the field to be irrigated. To that end, and speaking now only of that form of the invention shown in Figs. 1 to 6, inclusive, the end of the conduit section having the larger radius, in Fig. 2 the right-hand end, is formed with an inwardly extending flange composed, as best seen in Fig. 4, of a radially inwardly extending portion 17 and a reversely bent portion 18. Added to this flange is a cushioning and sealing gasket 19 which is U-shaped in transverse section and has one leg 20 received between the reversely bent portion 18 and the side wall of the conduit while the other leg 21 overlies the inner face of the reversely bent portion. The reversely bent portion 18 is given its final position after the gasket 19 has been mounted over the portion 18 so that the flange serves as a retaining means for the gasket 19 by clamping the leg 20 thereof. In this way, there is no accidental loss of the gasket 19, neither is there any shifting of the gasket as an incident to the placing of the smaller end of another section of conduit therein.

The gasket 19 has a width of three-quarters of an inch to an inch and a radial thickness of one-quarter to one-half of an inch, in a conduit with a diameter of eight or ten inches. The gasket, moreover, is composed of natural or synthetic rubber or some other rubber-like material, deformable but highly resilient and, of course, forming a seal against the leakage of water. The importance and significance of the construction of the cushioning and sealing gasket will become apparent as the description proceeds.

Means is provided for locking the conduit sections in assembled position, with the means herein positively locking the sections against longitudinal separation while permitting the angular disposition of the sections one relative to the other and while also functioning to retain the tightness of the seal in the various positions of the sections. A major element in this locking means is a flat bar 23 notched on both sides near both ends to terminate at both ends in a T-shaped portion 24 having a cross bar 25 and a stem 26. For a purpose which will later become more apparent, the transverse sides 27 of the notches forming the T-shaped portion 24 are inclined toward one another as they progress inwardly to form cam surfaces. The bar 23 is composed of a resilient metal permitting the bar to be bowed under stress but tending to return to a straight line. The main portion of the bar, that is, less the T-shaped portions, is made very slightly longer than the internal diameter of the smaller end of the conduit section 10 and this portion also is made to have a width somewhat greater than the length of the cross bar portion 25 of the T 24.

To permit the bar 23 to perform its locking function, each conduit section is formed with two pairs of slots 28 and 29. The slots 28 are formed opposite one another at the larger end of the conduit section spaced inwardly from the sealing gasket 19 and slightly downwardly from the upper edge of the section. These slots substantially rectangular, having a longitudinal dimension not less than slightly greater than the length of the cross bar portion 25, and having a transverse dimension just slightly greater than the width of the stem 26 of the T-shaped portion 24. The slots 29 are formed in the other or smaller end of the conduit section 10 being again spaced inwardly from the end of the section and downwardly from the upper edge of the section. Inasmuch as the slots 29 are to be in approximate registry with the slots 28 when the end of one conduit section is placed within the seal-carrying end of another conduit section, the slots 29 have to be somewhat lower relative to the top edge of the section than the slots 28. Like the slots 28, the slots 29 have a longitudinal dimension which is slightly greater than the length of the cross bar portion 25 but less than the width of the main portion of the bar 23, and have a transverse dimension which at the point of maximum width of the slot is greater than the width of the stem portion 26 of the T 24. The slots 29, instead of being rectangular, have their side walls diverging laterally from each end, as best seen in Fig. 6, so as to form a slot that is slightly wider at the midpoint than at the ends. Thus again cam surfaces are formed, the purpose of which will presently be made more apparent.

To join two sections, the smaller radius end of one section is placed within the larger radius, sealing ring-carrying end of another section, with the two sections overlapping sufficiently so that the slots 29 of the now inner section are in substantially longitudinal alignment with the slots 28 of the now outer section. Due to the presence of the sealing gasket 19, the slots 29 will at this time probably be slightly higher than the slots 28. To lock the conduit sections together by means of the bar 23, therefore, the bar is first placed flatwise so as to be capable of having the cross bar portion 25 of the T 24 inserted first through one of the slots 29 and then through one of the slots 28. The chances are that the bar will have to be held so as to incline downwardly from the slot 29 to the slot 28. The bar 23 is then given a substantial, upward bow so as to shorten the bar enough so that the remaining end thereof may be inserted first through the slot 29 on the opposite side of the inner conduit section and then through the slot 28 on the opposite side of the outer conduit section. Once both ends of the bar are inserted through both conduit sections, the bar is turned through 90° to be on edge, as shown in Figs. 2 and 5, and thereby lock itself in retaining relationship to the conduit sections. It will be appreciated that, as an incident to the insertion and rotation of the bar, several actions take place tending to tighten the seal of the gasket 19 about the inner conduit section. First of all, the inner conduit section is forced downwardly against the sealing gasket 19. Since the main portion of the bar 23 is, as above stated, slightly longer than the diameter of the smaller end of the conduit section, a straightening out of the bar 23 urges the smaller end of the conduit section outwardly into tighter engagement with the sealing ring 19. Further, rotation of the bar from its flatwise to its edgewise position is facilitated by the inclination of the side walls 27 of the notches. As the bar is rotated, the outer, more widely spaced portions of the walls 27 of the notches will first engage the conduit sections and, as rotation of the bar continues, the sections will, of course, be drawn closer and closer together as the inner, narrower part of the notches comes into play. The shape of the notches 29 will tend to hold the bar 23 in edgewise position and will also facilitate turning of the bar from a flat to an edgewise position.

It will be noted from Figs. 2, 4 and 5 that the conduit sections have an overlap and that the slots 28 and 29 in the joined position of the conduits lie inwardly of the sealing gasket 19. It is also to be noted that the length of the stem portion 26 of the T-shaped portions 24 is greater than the combined radial thickness of the two conduit sections of the sealing gasket 19. This, coupled with the resiliency and deformability of the sealing gasket 19, permits a joining of the conduit sections in other than a true, coaxial alignment and permits the sections to be placed at an angle relative to one another as shown in Fig. 5. The sealing gasket 19 herein acts as a swivel means or pivot means within or about which the inner conduit section may be displaced angularly relative to the outer conduit section. In such angular displacement of one section relative to the other, the bar 23 shifts longitudinally of the slot 28 while being held in on-edge position by the slots 29. In this connection, it is pointed out that the stem portion 26 of the T-shaped portion 24 is long enough to accommodate and permit the swinging away of one side of the inner section from the outer section.

Supports or bases 31 are provided for holding the trough-like conduit sections 10 from rolling on their sides. While these might be formed so as to be separable and distinct from the conduit sections 10, they are in Figs. 1 to 6 formed as a permanent part of each section. The supports may, like the section, be formed from a piece of sheet metal and are herein shown as so formed. An approximately rectangular piece of sheet metal may be employed with the sheet bent along three sides to form reinforcing flanges 32. The sheet is then cut away so that the major portion of the fourth side is in the form of a semicircle 33 of a diameter corresponding to the diameter of the flange 17. The support thus formed is conveniently and permanently secured to the section 10 by welding to the flange 17.

If desired, gates 35 may be employed to maintain a certain level of water in each section 10. Such a gate is also made of sheet metal with a radius just slightly larger than the smaller end of the conduit section and preferably is formed with a flange 36 bent at right angles and terminating short of the edges of the gate so as to be receivable and rest within the smaller end of a section to be positioned as shown in Figs. 2, 3 and 4. Inasmuch as the flow of water is from the left to the right, as viewed in Figs. 2 and 4, the inner end of the inner section 10 serves as a shoulder supporting the gate in upright position against the pressure of water which bears against it and acts to hold it against the shoulder thus formed. With the gate having a smaller radius than the larger end of the conduit section, it will, even when in position, not interfere with angular displacement of one section relative to the other but will simply be carried with the inner section while still performing its function of maintaining a certain level of water in the conduit.

Turning now to Figs. 7 to 12, inclusive, there is disclosed therein a slightly modified form of the invention. This modification resides primarily in the construction of the seal at the joint of two sections, the locking of the sections together, and the securing of the supporting bases, the conduit sections and the valve means otherwise being similar to the form disclosed in Figs. 1 to 6. In the modified form disclosed in Figs. 7 to 12, inclusive, the seal is of such character that the end of the conduit section 10 having the larger radius may, like the other end, terminate in a simple edge devoid of flanges or other means necessitating a special forming operation. To that end, a sealing and cushioning gasket 38 is provided which in transverse cross section is U-shaped and has two arms or legs 39 and 40 of equal length and equal thickness. By way of illustration but not of limitation, these legs or portions of the gasket 38 have a thickness in the order of a quarter of an inch or more and a length in the order of an inch or more. The gasket is adapted to fit over that end of the conduit section having the larger radius so that one leg or layer 39 of the gasket is disposed on the outside of the conduit section and the other leg or layer 40 is disposed on the inside of the conduit section. The gasket is, of course, composed of natural or synthetic rubber or some other rubber-like material deformable but highly resilient and impervious to water.

In forming a joint, the end of the section having the smaller radius is placed in the end of another section having the larger radius and, of course, having the gasket 38 applied thereto. There thus results a construction, best seen in Fig. 11, composed of the smaller radius end of one conduit section, a leg or layer 40 of the gasket 38, the larger radius end of another section of conduit, and the leg or layer 39 of the sealing gasket. The leg or layer 39 of the sealing gasket 38 is in turn interposed between two thicknesses of metal for a support or base 41 for the conduit sections is in this form of the invention constructed to provide that outer thickness of metal and to form a part of the locking means.

The support or base 41, like the conduit section, may be formed from sheet metal by simple cutting and bending operations and in this form of the invention is separable from and not permanently secured to the conduit section, and thus further facilitates nesting of the sections for storage and transportation and further reduces the cost of manufacture of the conduit section by eliminating a welding or similar operation. As seen in Fig. 8, the base 41 has a straight bottom edge to adapt it to rest flat on the ground and that edge has a flange 42 bent at right angles to the main portion of the support so as to form a broad foot that will rest on and not cut into the ground as would the very narrow and sharp edge that would bear against the ground save for the provision of the flange 42. For purposes of increased strength, this flange 42 is also formed on the generally vertical side edges of the support 41 so as to strengthen the support against buckling under the weight of the conduit sections and the water carried therein. The upper edge of the support 41 is in the main generally semicircular, conforming generally to the shape of the end of a section having the larger radius. This curved upper edge is likewise bent at right angles to the main portion so as to form a flange 43 of a width not less than the width of the sealing gasket 38. It is the flange 43 that forms the outer layer or thickness of metal for the leg or layer 39 of the gasket 38.

Means is provided for locking the conduit sections in assembled position and at the same time attaching to the conduits the base or support 41. This locking means, though performing the added function of also securing the base or support 41, still functions to permit angular displacement of joined conduits while retaining a tight seal in the various positions of the conduit sections. A major element in this locking means is a flat bar 23' which is the same in all respects to the bar 23 save that the stem 26' of the T-shaped portion 24' is somewhat longer than that of the bar 23 so as to accommodate the flange 43 of the support or base 41.

To permit the bar 23' to perform its locking and securing function, each conduit section is formed with two pairs of slots 44 and 45. The slots 44 are formed opposite one another at the end of the conduit section having the larger radius spaced slightly downwardly from the upper edge of the section and inwardly from the end of the section but within the area covered by the sealing gasket 38. These slots 44 are formed the same as the slots 29 in the first form of the invention and will not again be described save to say that they are identical with the slots 29 except for location in the conduit. The slots 45 are formed in the other or smaller radius end of the conduit, are spaced inwardly from the end of the section so as again to be in the area covered by the leg or layer 40 of the seal 38, and are spaced downwardly from the top edge of the conduit section a distance somewhat greater than the corresponding spacing of the slots 44 to compensate for the decrease in radius of this end of the section. The slots 45 are rectangular as are the slots 28 in the form of the invention shown in Figs. 1 to 6, inclusive. A third pair of slots 46 is formed in the support or base 41, these slots being identical with the slots 44 in so far as shape is concerned. These slots are formed in the flange 43 so spaced from the top edge of the support as to be in registry or approximate registry with the slots 44 and 45 when the conduit sections are assembled to form a contiuous conduit. The sealing gasket 38 will, of course, also have formed in each of the legs or layers 39 and 40 thereof slots 47 which register with the slots 44 when the seal is applied over the end of a conduit section. These slots 47 need not be and usually are not more than mere slits permitting the T-shaped ends of the bar 23' to be forced therethrough, the material of the sealing gasket 38 yielding to permit the rotation of the bar 23' and particularly the stem portion 26' of the T-shaped portion 24'.

To join two sections, the sealing gasket 38 is first slipped over the larger radius end of one section. The smaller radius end of another section is then placed within the larger radius end of the first section, being spaced therefrom by the leg or layer 40 of the gasket 38. Next the support 41 is placed in surrounding relation to the leg or layer 39 of the gasket. The bar 23' is then inserted flatwise, i. e., in the broken line position of Fig. 11, through the registering or approximately registering slots in the conduit sections, the seal and the support. Once the ends of the bar have been fully inserted, the bar is rotated 90° upon its own axis, i.e., to the solid line edgewise position of Fig. 11, thereby turning the cross bar 25' of the T-shaped portion at right angles to the slots, particularly the slots 46 in the support 41, to lock the sections together and the support to the sections. The sections are now securely held against axial separation while the conduit sections may, nevertheless, be placed at a slight angle to one another. As best seen in Fig. 10, such placing of conduit sections at a slight angle relative to one another is effected without breaking the seal or joint between the sections because of the yieldable character of the gasket 38 and because the slots 45 are so shaped that there may be movement of one or both sides of a section relative to the bar 23' to the extent of the length of the slots 45. The bar 23' will, by the slots 44 and by the slots 46 in the base 41, be retained extending truly transversely of what at the joint constitutes the outer section, the inner section being permitted the limited movement relative to the bar necessary to have the sections assembled at a slight angle relative to one another.

It is believed apparent from the foregoing that I have perfected irrigating means containing many advancements and having many advantages over irrigating means heretofore known. With the conduit sections made from very light sheet metal and with the sections capable of being nested, many can be carried by an individual and many hundreds can be transported by a single truck. This greatly facilitates and reduces the labor and time involved in placing and again picking up these conduits. Moreover, being made from sheet metal by simple stamping and forming operations, many while the sheet is flat, the cost of the conduit sections is much less than anything heretofore conceived, yet, despite this reduction in weight and the great economy of manufacture, the sections are by the construction used more than sturdy enough to serve the purpose intended. The sections are well sealed at the joints and the joints, moreover, permit some angular displacement of one section relative to the other so that the resultant water-conveying means may, if necessary, depart from a straight line to follow the contour of the ground or the shape of the field or some other factor dictating that the conduit sections be placed at an angle relative to one another. When not in use, the conduit sections may be stacked one within another to conserve space. Moreover, they may be used with or without gates for, with the construction provided, the ends of the inner sections serve as a shoulder for retaining the gates when they are employed.

I claim as my invention:

1. A fluid conducting means comprising a plurality of readily separable conduit sections, each of said sections being slightly less than semi-cylindrical to permit nesting and having one end of smaller radius than the other to permit joining into a continuous conduit, means forming a seal between adjoining sections when assembled with the smaller end of one section in the larger end of another section including a gasket of resilient, deformable material and of considerable radial thickness interposed between said sections, and readily joinable and removable means for locking together the overlapping ends of said sections including a locking bar having a lost motion engagement with at least one of the sections at the joint to permit disposition of the sections at an angle to one another.

2. A fluid conducting means comprising a plurality of separable conduit sections, each of said sections being slightly less than semicylindrical to permit nesting and having one end of smaller radius than the other to permit joining into a continuous conduit, means forming a seal between adjoining sections when assembled with the smaller end of one section in the larger end of another section comprising an inwardly and reversely bent flange at the larger end of each section and a cushioning and sealing gasket of rubber-like material U-shaped in transverse section and mounted astraddle the reversely bent portion of said flange to make sealing contact with the conduit section placed therein, and means for locking together the overlapping ends of said sections urging the inner section downwardly and outwardly against said gasket, said seal and locking means permitting angular displacement of joined sections relative to one another in at least two directions.

3. In a fluid conducting system a trough-like conduit section larger at one end than at the other and having diverging side walls, a gasket of resiliently yieldable material mounted at the larger end of said section to engage in sealing relationship the smaller end of another section disposed therein, said conduit section having a pair of opposed slots formed in the larger end of said section spaced inwardly from the end and slightly downwardly from the upper edges of said section and a pair of opposed slots formed in the smaller end of said section spaced inwardly from the end thereof and spaced downwardly from the upper edges of said section, and means for cooperating with said slots for readily releasably locking together a pair of sections placed with the smaller end of one within the larger end of the other comprising a bar carrying at each end thereof a T-shaped extension adaptable to pass through the slots in the over-lapping portions of said sections when held in one position and assuming a locking position when rotated 90° about its axis.

4. In a fluid conducting system a trough-like conduit section larger at one end than at the other to permit assembly as a continuous conduit and having diverging side walls to permit nesting, a gasket of resiliently yieldable material at the larger end of said section positioned to engage in sealing relationship the smaller end of another section disposed therein, a pair of opposed slots formed in the larger end of said section spaced inwardly from the end and slightly downwardly from the upper edges of said section, a pair of opposed slots formed in the smaller end of said section spaced inwardly from the end thereof and downwardly from the top edges, each of said slots being elongated and disposed with its major dimension extending longitudinally of the section, the slots of one pair being rectangular and the slots of the other pair having side edges diverging outwardly from each end thereof, and means for locking together a pair of sections disposed with the smaller end of one section received in the larger end of another section comprising a bar carrying T-shaped extensions at each end operable to pass through said slots when disposed in one position and to lock said sections against separation when said bar is rotated about its longitudinal axis 90° from the first named position.

5. In a fluid conducting system, an approximately semicylindrical conduit section of larger radius at one end than at the other and having at the larger end a radially inwardly extending flange with a radial portion and a reversely bent portion, a cushioning and sealing ring of rubber-like material U-shaped in transverse section and mounted with one leg clamped between said section and said reversely bent portion and with the other leg overlying said reversely bent portion, an elongated slot formed in said section near each top edge thereof spaced inwardly from said flange and an elongated slot in said section near each top edge thereof spaced inwardly from the other end of said section, and means for locking two of said sections together with the smaller end of one section in the larger end of another comprising a cross bar having a reduced neck portion at each end, said bar beyond said neck being narrower than the length of said slots but wider than the width thereof.

6. In a fluid conducting system, an approximately semicylindrical conduit section of larger radius at one end than at the other and having at the larger end a radially inwardly extending flange with a radial portion and a reversely bent portion, a cushioning and sealing ring of rubber-like material U-shaped in transverse section and mounted with one leg clamped between said section and said reversely bent portion and with the other leg overlying said reversely bent portion, and means for locking two of said sections together with the smaller end of one section in the larger end of another comprising an element operable to engage both sections in a manner to urge the inner section downwardly into and outwardly against said sealing ring while providing a lost motion connection permitting disposition of said joined conduit sections at a slight angle relative to one another.

7. In a fluid conducting system, an approximately semicylindrical conduit section of larger radius at one end than at the other, a flange formed along each longitudinal edge of said section to stiffen the same, a flange formed at the larger end of said section by bending the end thereof radially inwardly, and a supporting base for holding said section upright and against rolling over comprising a cradle-shaped piece flanged around three sides thereof to strengthen the same and permanently secured to said radial flange.

8. In a fluid conducting system, a trough-like conduit section having diverging sides to permit nesting of the sections when not in use, each of said sections being less than semicylindrical and having one end larger than the other to permit formation of a continuous conduit by limited overlapping of the large with the small end of successive conduit sections, a removable gasket interposed between the overlapped ends of adjacent sections to form a seal therebetween, a readily removable cradle-like support for retaining said sections in upright position, and readily removable means for locking together overlapping sections with said gasket clamped therebetween and simultaneously securing said supporting means.

9. In a fluid conducting system, a trough-like conduit section having diverging sides to permit nesting of the sections when not in use and having one end larger than the other to permit formation of a continuous conduit by limited overlapping of the large with the small end of successive conduit sections, a gasket of U-shaped transverse cross section slidable over the larger end of said section to form a sealing layer on both sides of said section at the larger end thereof, a cradle-like support for said conduit sections having a longitudinally extending flange adapted to overlie the outer layer of said gasket, and means operable to pass through both conduit sections, both layers of said gasket, and the longitudinally extending flange of said supporting means to lock the various elements together.

10. In a fluid conducting system, a trough-like conduit section having diverging sides to permit nesting of the sections when not in use and having one end larger than the other to permit formation of a continuous conduit by limited overlapping of the large with the small end of successive conduit sections, a sealing gasket of U-shaped transverse cross section operable to slide over the end of larger radius of any conduit section to provide a layer of sealing means on each face of the section at the end over which said gasket is mounted, elongated generally longitudinally extending slots in said section at both ends thereof spaced inwardly from the end and downwardly from the side edges, said gasket having elongated slots therein adapted to register with the slots in the larger end of said section, a cradle-like support for said conduit sections having a longitudinally extending flange adapted to lie against the outer layer of said gasket, elongated slots formed therein adapted to register with the slots in said sections and said gasket when assembled, and means for locking said parts together comprising a flat bar having T-shaped portions at each end adapted to be insertable through said slots in one position and to lock the elements together in a rotated position of said bar.

11. A fluid conducting means comprising a plurality of trough-like, separable, overlapping conduit sections, gasket means interposed between adjoining sections to aid in sealing the conduit sections at the joining thereof, said gasket means being yieldable and conforming to the sections and contacting the outer surface of one section and the inner surface of the adjoining section, said gasket being of considerable radial thickness to space the sections one from the other to avoid interference of joined sections with one another during limited angular displacement relative to one another, diametrically opposed axially elongated slots formed in both sides of each section near the top thereof, and a pin extending through the slots of adjoining sections for locking the sections together whereby positively to restrain the sections against separation while keeping both sides free for relative movement for adjustment of joined sections in directions away from axial alignment.

HAROLD WARP.

REFERENCES CITED

The following references are of record in the file of this patent:

UNITED STATES PATENTS

| Number | Name | Date |
| --- | --- | --- |
| Re. 14,081 | Linweiler | Mar. 7, 1916 |
| 1,219,681 | Thorsby | Mar. 20, 1917 |
| 1,854,420 | Norton | Apr. 19, 1932 |